United States Patent
Godard et al.

[11] 3,935,544
[45] Jan. 27, 1976

[54] GAS LASER STRUCTURE FOR ELIMINATING PARASITIC ARCING

[75] Inventors: Bruno Godard, Gif sur Yvette; Bernard Lacour, Palaiseau; Jean-Paul Gaffard, Plaisir, all of France

[73] Assignee: Compagnie Generale d'Electricite, Paris Cedex, France

[22] Filed: Dec. 24, 1974

[21] Appl. No.: 536,061

[30] Foreign Application Priority Data
Dec. 27, 1973 France .............................. 73.46561

[52] U.S. Cl. ........... 331/94.5 PE; 330/4.3; 333/84 R; 333/84 M; 339/17 R; 339/117 P; 331/94.5 G
[51] Int. Cl.² ..................... H01S 3/097; H01S 3/03
[58] Field of Search ..... 339/17 R, 117 P; 333/84 R, 333/84 M; 331/94.5; 330/4.3

[56] References Cited
UNITED STATES PATENTS
3,879,681    4/1975    Godard et al. ............... 331/94.5 PE OTHER PUBLICATIONS
Basting et al., Opto–Electronics, 4, (1972), pp. 43–49.
Smith, IBM Tech. Discl. Bull., 9(2), July 1966, pp. 152–154.
Stuckert, IBM Tech. Discl. Bull., 8(4), Sept. 1965, pp. 518–519.

*Primary Examiner*—Robert J. Webster
*Attorney, Agent, or Firm*—Sughrue, Rothwell, Mion, Zinn & Macpeak

[57] ABSTRACT

Gas laser comprising a flat electric energizing line consisting of an insulating layer inserted between two metallic layers brought to different potentials, one of whose edges is cut out in the shape of a parabola, one slot being provided in one of the layers, an active gaseous medium flowing in the slot, a circuit for setting up a substantially punctiform discharge between the metallic layers at the level of the focus of the parabolas. The electric line is arranged on a massive plate comprising on the one hand a cut provided in its lower face substantially opposite the slot and communicating with the latter and on the other hand two grooves provided on its upper face each having fitted in it a flexible seal and arranged opposite the walls of the slot.

5 Claims, 2 Drawing Figures

GAS LASER STRUCTURE FOR ELIMINATING PARASITIC ARCING

The present invention concerns a gas laser generator and more particularly a laser generator in which a stimulated emission is obtained subsequent to an electrical discharge in an active gaseous medium.

Laser generators comprising a flat electric energizing line consisting of an insulating plate inserted between a first and second metallic plate, parallel to each other and connected respectively to the two terminals of a voltage source are known. One of the plates has at least one slot separating it into two distinct parts and means are provided for maintaining in that slot an active gaseous medium, the ends of the slot possibly being limited by an optical window. That generator comprises also means for generating in the electric line a progressive current wave having a perfectly plane wave surface. To obtain that result, at least the plate in which the progressive electric wave propagates is cut out at one of its ends to form a parabolic edge, the axis of the parabola defined by that edge forming an angle greater than zero with the line perpendicular to the slot and a circuit for setting up a substantially punctiform electrical discharge starting from the focus of the parabola to undergo a reflection on the parabolic edge of the plate constituting a reflector before reaching the slot is implemented.

The progressive current wave propagates in the active gaseous medium from one end to the other of the slot, at a speed substantially equal to that of the propagation of the stimulated light emission in the said slot.

In certain types of laser, the metallic plates are constituted by layers adhering to the faces of the insulating plate, so as to constitute a non-rigid assembly.

In these latter devices, it is possible to arrange on either side of the slot formed in one of the metallic layers, two metallic chocks brought or not brought to equal potentials, the cavity thus defined being stopped up by an insulating blade arranged bearing against the chocks.

Nevertheless, it is observed that at the time of the electrical discharge, parasitic arcs appear at the contact between the said chocks and the subjacent metallic layer, whence disturbances in the stimulated emission and a reduction which is sometimes substantial in the efficiency of the energetic conversion arise.

The present invention makes it possible to overcome such a major disadvantage.

It has for its aim a laser comprising :

an active gaseous medium;

a flat electric energizing line consisting of an insulating layer inserted between a first and second metallic layer, parallel to each other and connected respectively to the two terminals of a voltage source, the said first metallic layer having at least one slot separating it into two distinct parts;

means for maintaining an active gaseous medium flowing in the said slot, the edges of the said layers being in the form of parabolas whose axis forms an angle greater than zero with the line perpendicular to the slot;

means for generating a current wave in the said line, constituted by a circuit for setting up a substantially punctiform discharge between the said metallic layers at the level of the foci of the parabolas, characterized in that the said flat electric energizing line is arranged through the said second metallic layer on a massive plate comprising on the one hand a cut formed on its inside face substantially opposite the slot and communicating with that latter through several channels and on the other hand, two grooves formed on its upper face and each having fitted in it at least one seal made of a flexible material, the said grooves being arranged substantially opposite the ends of the said first metallic layer limiting the said slot.

Other characteristics and advantages of the invention become apparent from the following description, given by way of a purely illustrating example having no limiting character, with reference to the accompanying drawings and diagrams, in which.

Figure 1:
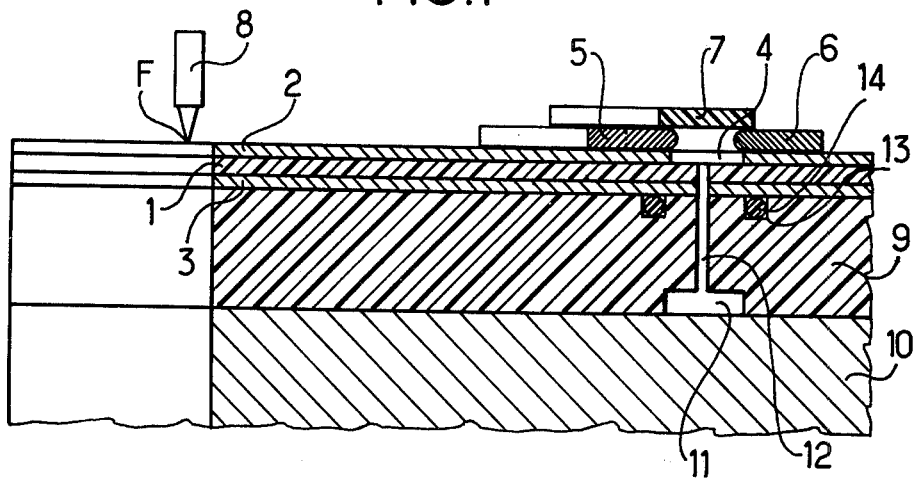
FIG. 1 is a cross-section view of an embodiment of a gas laser according to the invention.
Figure 2:
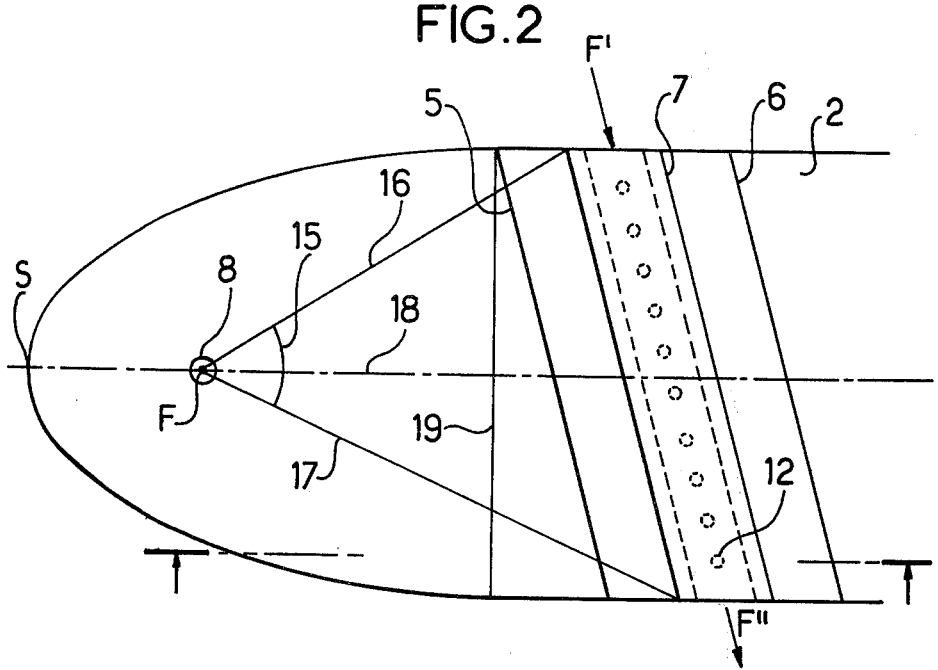
FIG. 2 is a top view of FIG. 1.

Thus FIGS. 1 and 2 show a gas laser comprising an insulating sheet 1 on whose faces are deposited, by any appropriate means, a first and second metallic layer 2 and 3, respectively.

It must be understood that, for clearness' sake in the drawing, the thickness of the layers has purposely been exaggerated.

The assembly constituted by the insulating sheet 1 and the two layers 2 nd 3 constitute a non-rigid assembly which may more particularly very easily be wound on itself. To give a clear idea, the sheet 1 may be made of a plastic material such as "MYLAR," and the layers 2 and 3 are constituted by a copper deposit.

Moreover, a slot 4 is formed in the metallic layer 2 and on the edges of that slot, metallic chocks 5 and 6 are arranged, an insulating plate 7 being arranged on the chocks 5 and 6.

It will be seen in FIG. 1 that the insulating sheet 1 co-operates with the metallic chocks 5 and 6 and the insulating plate 7 to define a volume or cavity accomodating the active gaseous medium.

Such an active gaseous medium is continuously directed in the said cavity in the direction F' and escapes in the direction F'', such a flow being ensured by means of a suction pump (not shown).

Moreover, as illustrated more particularly in FIG. 2, the metallic layers 2 and 3 and the insulating layer 1 are cut out in the shape of parabolas whose foci are F and whose apexes are S.

The laser also comprises a means 8 for setting up a punctiform discharge at the level of the focus of the parabolas, of any appropriate type.

Moreover, the assembly previously described is arranged on a massive plate 9 whose thickness is substantially greater than that of the plates 1, 2 and 3, such a plate resting, itself, for example, on a stand or a work bench 10.

The said plate 9 comprises on its lower face a cut 11 arranged substantially opposite the slot 4 and communicating with the latter through channels 12 consequently crossing through the plates 1 and 3.

Moreover, such a cut has a width at least equal to that of the slot. Furthermore, the plate 9 comprises on its upper face two grooves 13 arranged substantially opposite the ends of the metallic plate 2 defining the slot 4, each of the said slots having, fitted in it, an annular seal 14 made of a flexible material.

Moreover, as shown in FIG. 2, a reflector 15 constituted for example by a drilling in the plate 2 in the shape of an arc of a circle, centred on the point F, is arranged on the opposite side to S in relation to the focus F. Its transversal dimensions are limited by two straight lines joining the point F to the end points of the slot 30, for example the straight lines 16 and 17.

A gas laser according to the invention operates as follows:

At a given instant, the generating means 8 emits a pulse at the level of the foci F of the parabolas; the discharge wave emitted has a radial symmetry in relation to the foci F, the fraction of the discharge wave surface comprised in the angle defined by the straight lines 16 and 17 is reflected by the reflector 15.

All the waves emitted at the level of the focus F are therefore directed towards the parabola and are reflected on the latter; it is known that the parabola is perfectly stigmatic for two conjugated points: its focus F and infinity. The wave surface coming from F and reflected by the parabola is therefore a perfectly plane wave surface perpendicular to the axis 18 of the parabola and represented by its trace 19.

The progressive discharge wave 19 therefore reaches successively the atoms or the molecules of the active gas. The stimulated light emission is, therefore, effected from one end to the other of the cavity defined by the plates 5, 6 and the blade 7 in the direction of the arrow F'' at the same speed as the progressive wave 19 in the direction of that cavity. That condition makes it possible to obtain a very powerful coherent laser radiation at the output of the said cavity.

Moreover, the (low pressure) prevailing in the cavity defined by the chocks 5, 6, the blade 7 and the slot 4 results in the exerting, within the massive plate 9 of a stress directed upwards, in the region of the cut 11, subsequent to the presence of the channels 12 making the cavity communicate with the said cut. Such a stress therefore deforms the seals 14 arranged in the grooves 13, which press the ends of the metallic layers 2 hard against the ends of the chocks 5 and 6.

The result of this is an excellent electrical contact between the chocks and the ends of the layer 2, whence there results all disappearance of the parasitic arcs as mentioned hereinabove.

It must be understood that the invention is in no way limited to the embodiment described and illustrated, which has been given only by way of an example. More particularly, without going beyond the scope of the invention, details may be modified, certain arrangements may be changed or certain means may be replaced by equivalent means.

I claim:

1. In a traveling wave transmission line system for excitation of a laser having:

an active gaseous medium;

a flat electric energizing line consisting of an insulating layer inserted between a first and second metallic layer, parallel to each other and connected respectively to the two terminals of a voltage source, the said first metallic layer having at least one slot separating it into two distinct parts;

means for maintaining an active gaseous medium flowing in the said slot comprising metallic chocks (5,6) the edges of each of the said layers being in the form of a parabola whose axis forms an angle greater than zero with the line perpendicular to the slot; and means for generating a current wave in the said line, constituted by a circuit for setting up a substantially punctiform discharge between the said metallic layers at the level of the foci of the parabolas;

the improvement wherein said flat electric energizing line is arranged through the said second metallic layer (3) on a massive plate (9) comprising on the one hand a cut (11) formed on its inside face substantially opposite the slot (4) and communicating with that latter through several channels (12) and on the other hand, two grooves (13) formed on its upper face and each having fitted in it at least on seal (14) made of a flexible material, the said grooves (13) being arranged substantially opposite the ends of the said first metallic layer (2) limiting the said slot (4), the gaseous medium in the volume formed by said slot, channels and cut being at a lower pressure than ambient atmospheric pressure for deforming said seal in said grooves for pressing the ends of said first metallic layer hard against the ends of said metallic chocks or improving the electrical contact between said chocks and said distinct parts.

2. The improvement according to claim 1 wherein said cut (11) has a width at least equal to the width of the slot (4) formed in the said first metallic layer (2).

3. The improvement according to claim 1 wherein said cut (11) is insulated with respect to the ambient atmosphere so that the pressure prevailing within it be substantially equal to the pressure of the said active gaseous medium.

4. The improvement according to claim 1 wherein said means for maintaining an active gaseous medium flowing in the said slot comprises a longitudinal insulating blade (7) bearing against the metallic chocks (5,6) arranged on either side of the slot (4).

5. The improvement according to claim 1 wherein foci F as well as the apexes S of the parabolas are situated respectively on a same straight line perpendicular to the plane of the metallic layers.

* * * * *